United States Patent [19]

Usui et al.

[11] Patent Number: 4,585,748

[45] Date of Patent: Apr. 29, 1986

[54] CRYSTALLINE CATALYST COMPOSITIONS FOR THE CONVERSION OF HYDROCARBONS

[75] Inventors: Kazushi Usui, Chiba; Kinya Tawara, Saitama, both of Japan

[73] Assignee: Research Association for Residual Oil Processing, Tokyo, Japan

[21] Appl. No.: 614,094

[22] Filed: May 25, 1984

[30] Foreign Application Priority Data

May 25, 1983 [JP] Japan .................................. 58-92680

[51] Int. Cl.$^4$ .............................................. B01J 29/06
[52] U.S. Cl. ......................................... 502/66; 502/74
[58] Field of Search .................................... 502/66, 74

[56] References Cited

U.S. PATENT DOCUMENTS

| | | | |
|---|---|---|---|
| 3,597,349 | 8/1971 | Bertolacini et al. | 502/66 X |
| 3,706,693 | 12/1972 | Mikelson et al. | 502/210 X |
| 3,835,027 | 9/1974 | Ward | 502/66 X |
| 3,917,543 | 11/1975 | Boltone et al. | 502/66 |

*Primary Examiner*—Carl F. Dees
*Attorney, Agent, or Firm*—Sughrue, Mion, Zinn, Macpeak and Seas

[57] ABSTRACT

A hydrocarbon conversion crystalline catalyst composition is described comprising 5 to 90% by weight of a crystalline aluminosilicate zeolite, 5 to 90% by weight of a porous inorganic oxide, 1 to 20% by weight of a Group VI metal component (calculated as the corresponding oxide), 0 to 7% by weight of a Group VIII metal component (calculated as the corresponding oxide), and at least one of phosphorus and boron components. The weight ratio of the amount of the phosphorus+boron components (calculated as elemental phosphorus and elemental boron) to the Group VI metal component (calculated as the corresponding oxide) is from 0.01:1 to 0.08:1 and the weight ratio of each of phosphorus and boron to the Group VI metal component is below 0.045:1. This composition is prepared by contacting a support comprising the crystalline aluminosilicate zeolite and inorganic oxide with a solution containing a Group VI metal component and at least one phosphorus or boron component. The weight ratio of elemental phosphorus+elemental boron to the Group VI metal component (calculated as the corresponding oxide) is from 0.01:1 to 0.08:1 and the weight ratio of each of elemental phosphorus and elemental boron to the Group VI metal component (also calculated as the corresponding oxide) is below 0.045:1. The solution has a pH of from 3.3 to 6.0. The Group VI metal component and at least one of the phosphourus and boron components are deposited on the support.

23 Claims, No Drawings

CRYSTALLINE CATALYST COMPOSITIONS FOR THE CONVERSION OF HYDROCARBONS

BACKGROUND OF THE INVENTION

1. Field of the Invention

The present invention relates to crystalline catalyst compositions for the conversion of hydrocarbons, particularly for hydrocracking, and a process for the preparation of such crystalline catalyst compositions.

The term "crystalline catalyst composition" as used herein, as will be apparent from the explanation hereafter, does not mean that the whole catalyst is in crystalline form, but means that a substantial proportion of the zeolite component in the catalyst is present while retaining the crystal structure of zeolite. The terms "Group VI metal" and "Group VIII metal" as used herein mean "Group VI metal of the Periodic Table" and "Group VIII metal of the Periodic Table", respectively.

2. Development of the Invention

In general, hydrocarbon hydrocracking catalysts have two functions: acid activity to cleave a carbon-carbon bond and hydrogenation activity to hydrogenate olefinic molecules resulting from the cleavage. The acid activity is exhibited by acid sites of the catalyst and the hydrogenation activity is exhibited by metals deposited on the catalyst. Crystalline aluminosilicate zeolite (hereinafter sometimes referred to merely as "zeolite") possesses a crystal structure in which silicon and aluminum are regularly bond. Thus, the density of the acid sites of the zeolite, the acid sites occurring at the contact point between two elements, is much greater than those of inorganic compounds such as silica and alumina. For this reason, zeolite is often used as one component of this type of catalyst.

Zeolite, however, has the disadvantage in that upon exposure to water vapor at elevated temperatures, its crystal structure is easily destroyed, resulting in a reduction in catalytic activity. In order to stabilize the crystal structure of zeolite against water vapor at elevated temperatures, various improvements have been made. For example, U.S. Pat. Nos. 3,536,606, 3,867,277 and 4,036,739 disclose a method of preparing stabilized and highly active zeolite, in which sodium ions contained in zeolite are partially replaced by ammonium ions, the zeolite is calcined in a steam atmosphere while controlling the temperature, processing time and steam partial pressure, sodium ions remaining in the zeolite are further replaced with ammonium ions, and then the zeolite is calcined. U.S. Pat. No. 3,669,873 discloses a method of preparing stabilized and highly active zeolite by subjecting the same to ion exchange using alkaline earth metal ions or rare earth metal ions.

These methods enable one to improve the tolerance of zeolite to water vapor at elevated temperature, i.e., the hydrothermal stability of zeolite. However, in employing these methods, another problem is encountered, that is, when certain metal components such as Group VI metal components of Group VI metals of the Periodic Table are deposited on zeolite, the crystal structure is destroyed and, therefore, adequate catalytic activity cannot be obtained.

As discussed above, hydrocracking catalysts are composed of two components: (1) a component having acid sites, such as zeolite, and (2) a metal component having hydrogenation activity deposited on component (1). As component (2), metal components of Group VI and VIII metals of the Periodic Table are used. In particular, when metal components of Group VI metals are deposited, there is a tendency for the crystal structure to be destroyed which leads to a serious reduction in the number of zeolite acid sites and thus a high activity hydrocracking catalyst cannot be obtained.

Metal component (2) can be deposited by various procedures such as dipping a support in a solution containing the metal component, kneading a support with a solution containing the metal component and depositing the metal component on a support by ion exchange. With all of these methods there is observed the above-described tendency that the crystal structure of zeolite is destroyed.

The methods disclosed in the above-described U.S. Patent specifications have some additional disadvantages. For example, the methods are disadvantageous for industrial use since they are complicated operation, and, even if ion exchange using alkaline earth metal ions or the like is applied, hydrothermal stability is improved insufficiently.

U.S. Pat. No. 3,706,693 and Canadian Pat. Nos. 972,308 and 972,340 disclose hydrocarbon conversion catalysts which are prepared by contacting a support comprising zeolite and inorganic oxides such as alumina with an aqueous solution containing Group VI metal compounds, Group VIII metal compounds and acids of phosphorus, the weight ratio of phosphorus to the Group VI metal compound (calculated as an oxide) being from 0.05:1 to 0.5:1, and having an initial pH value of below 3.0. It is described that although the crystal structure of zeolite is destroyed since a large amount of phosphoric acid is added under strongly acid conditions in depositing the hydrogenation metal component, hydrocracking activity, denitrogenation activity and selectivity for an intermediate fraction can be increased. In accordance with the methods described in the above-described U.S. and Canadian Patent specifications, the high cracking activity of zeolite is intentionally decreased by destroying the crystal structure of zeolite and, therefore, the hydrocracking activity is not sufficiently high.

SUMMARY OF THE INVENTION

As a result of extensive research to develop hydrocarbon conversion catalysts of high catalytic activity, in particular, high hydrocracking activity, it has been found that (1) if a Group VI metal component is deposited on a crystalline aluminosilicate zeolite-containing support under specific conditions, the crystal structure of the zeolite is not destroyed and (2) the thus-prepared catalyst composition having the specified formulation exhibits high activity in the conversion of hydrocarbons, particularly in hydrocracking. The present invention is based on these findings.

The main object of the invention is to provide crystalline catalyst compositions for the conversion of hydrocarbons which have very high catalytic activity, in particular, very high hydrocracking activity.

Another object of the invention is to provide crystalline catalyst compositions for the conversion of hydrocarbons which can be used in the conversion of not only a distillate oil fraction but also heavy oils such as crude oil and residual oil.

Still another object of the invention is to provide a process for preparing such hydrocarbon conversion crystalline catalyst compositions.

A further object of the invention is to provide a process for converting hydrocarbon feedstocks by the use of such hydrocarbon conversion crystalline catalyst compositions.

Other objects of the present invention will become apparent from the following detailed description.

DETAILED DESCRIPTION OF THE INVENTION

The present invention, in one embodiment, relates to a crystalline catalyst composition for the conversion of hydrocarbons, which comprises:

5 to 90% by weight, based on the total catalyst weight, of a crystalline aluminosilicate zeolite;

5 to 90% by weight, based on the total catalyst weight, of a porous inorganic oxide;

1 to 20% by weight, based on the total catalyst weight, of a Group VI metal component (calculated as the corresponding oxide) of a Group VI metal of the Periodic Table;

0 to 7% by weight, based on the total catalyst weight, of a Group VIII metal component (calculated as the corresponding oxide) of a Group VIII metal of the Periodic Table; and further contains a third component selected from a phosphorus component and a boron component in such a proportion that the weight ratio of the total amount of the phosphorus and boron components (calculated as elemental phosphorus and elemental boron) to the Group VI metal component (calculated as the corresponding oxide) is from 0.01:1 to 0.08:1 and the weight ratio of each of the phosphorus component and the boron component (calculated as elemental phosphorus and elemental boron) to the Group VI metal component (calculated as the corresponding oxide) is below 0.045:1.

In another embodiment, the present invention relates to a process for preparing the crystalline catalyst composition as defined above.

In still another embodiment, the present invention relates to a process for converting hydrocarbon feedstocks by the use of the crystalline catalyst composition as defined above.

In a preferred embodiment of the present invention, the crystalline catalyst composition for the conversion of hydrocarbons comprises:

5 to 90% by weight, based on the total catalyst weight, of a crystalline aluminosilicate zeolite;

5 to 90% by weight, based on the total catalyst weight, of a porous inorganic oxide;

1 to 20% by weight, based on the total catalyst weight, of a Group VI metal component (calculated as the corresponding oxide) of a Group VI metal of the Periodic Table;

0 to 7% by weight, based on the total catalyst weight, of a Group VIII metal component (calculated as the corresponding oxide) of a Group VIII metal of the Periodic Table; and a third component selected from a phosphorus component and a boron component, which is prepared by contacting a support comprising the crystalline alumino-silicate zeolite and the porous inorganic oxide with a solution containing the Group VI metal component and the third component selected from the phosphorus and boron components, the weight ratio of the total amount of the phosphorus and boron components (calculated as elemental phosphorus and elemental boron) to the Group VI metal component (calculated as the corresponding oxide) being from 0.01:1 to 0.08:1 and the weight ratio of each of the phosphorus component and the boron component (calculated as elemental phosphorus and elemental boron) to the Group VI metal component (calculated as the corresponding oxide) being below 0.045:1, and said solution having an initial pH value of from 3.3 to 6.0, whereupon the Group VI metal component and the third component selected from the phosphorus and boron components are deposited on the support.

The crystalline catalyst composition of the present invention comprises:

a support comprising the inorganic oxide as a matrix and the crystalline aluminosilicate zeolite; and the Group VI metal component, the phosphorus and-/or boron component, and if desired, the Group VIII metal component deposited on the support. The crystalline aluminosilicate zeolite is a catalyst component having a cracking action but, in the present invention, also acts as a support on which Group VI metals, Group VIII metals, phosphorus, and boron are deposited. Thus, the crystalline aluminosilicate zeolite is called a support herein along with other supports such as alumina.

The crystalline aluminosilicate zeolite (which is, as disclosed above, sometimes referred to merely as "zeolite") incorporated in the crystalline catalyst composition of the present invention is ion-exchangeable and may be natural or synthetic. Examples of crystalline aluminosilicate zeolites are faujasite X-type zeolite, faujasite Y-type zeolite, chabazite-type zeolite, mordenite-type zeolite, and ZSM-base zeolites containing organic cations. These ZSM-base zeolites include ZSM-4, ZSM-5, ZSM-8, ZSM-11, ZSM-12, ZSM-20, ZSM-21, ZSM-23, ZSM-34, ZSM-35, ZSM-38 and ZSM-43, which are described in detail in, for example, *Advance and Data of Recent Zeolite Technology and Application*, published by Nippon Gijutsu Keizai Center Publishing Department (Jan. 11, 1982), pages 46–57, *Zeolite*, edited by N. Hara et al. and published by Kodansha Co. (Feb. 1, 1975), pages 46–47, and Japanese Patent Application (OPI) No. 70828/82 (the term "OPI" as used herein means a "published unexamined Japanese patent application"). Preferred are those crystalline aluminosilicate zeolites in which the atomic ratio of elemental silicon to elemental aluminum (Si/Al) is about 1:1 or more, especially from about 1:1 to about 100:1, and the cation exchange capacity is at least about 0.3 meq/g. Also preferred are the ammonium ($NH_4^+$) or hydrogen ($H^+$) forms of crystalline aluminosilicate zeolites, and those crystalline aluminosilicate zeolites in which ammonium or hydrogen ions are ion exchanged with alkaline earth metal ions (e.g., $Mg^{++}$, $Ca^{++}$ and $Ba^{++}$), rare earth metal ions (e.g., $La^{++}$ and $Ce^{++}$), and Group VIII metal ions (e.g., $Co^{++}$, $Ni^{++}$, $Pd^{++}$ and $Pt^{++}$). Alkali metal ions (e.g., $Na^+$), if contained in crystalline aluminosilicate zeolites in large proportions, reduce the catalytic activity of the finished crystalline catalyst composition. Thus, it is preferred for the alkali metal ion content of a crystalline aluminosilicate zeolite to be reduced to about 0.5% by weight or less. The surface area of the crystalline aluminosilicate zeolite is usually from about 200 to 800 m²/g.

The amount of crystalline aluminosilicate zeolite (dry basis; containing ion exchanged metals) being compounded is usually from about 5 to 90% by weight, preferably from about 10 to 80% by weight, based on the total catalyst weight of the finished crystalline catalyst composition. If the amount of the crystalline aluminosilicate zeolite is too small, the cracking activity of the finished crystalline catalyst composition drops, whereas if it is too large the amounts of other components being compounded to form the catalyst are inevitably reduced, resulting in the formation of hydrocracking catalysts which are not suitable for practical use.

Preferred examples of porous refractory inorganic oxides which are to be added as the matrix to the crystalline catalyst composition of the present invention include alumina, silica-alumina, titania-alumina, zirconia-alumina, and silica-titania-alumina. The alumina content of the matrix is preferably from about 20% to 100% by weight based on the weight of the matrix. It is preferred for the surface area of the matrix to be at least about 30 m$^2$/g, especially from about 50 to 300 m$^2$/g.

The matrix is effective to increase the strength of the catalyst and the hydrocracking selectivity and further contributes to a reduction in the production cost of the catalyst. The amount of the matrix compounded is from about 5 to 90% by weight, preferably from about 20 to 90% by weight, based on the total catalyst weight of the finished crystalline catalyst composition. If the matrix is not added or the amount of the matrix compounded is too small, the hydrocracking selectivity drops, resulting in the formation of large amounts of undesirable gases and coke. On the other hand, if the amount of the matrix compounded is too large, the amounts of other components compounded are reduced, resulting in the formation of hydrocracking catalysts which are not suitable for practical use.

The hydrogenation metal component compounded in the crystalline catalyst composition of the present invention include metal components of Group VI metals, such as molybdenum, tungsten and chromium, and metal components of Group VIII metals, such as cobalt and nickel belonging to the iron group and noble metals (e.g., platinum and palladium). In the crystalline catalyst composition of the present invention, it is not always necessary to add Group VIII metal components. The amount of the hydrogenation metal component (calculated as the corresponding oxide, e.g., the corresponding oxides of Mo, W, Cr, Co, Ni, Pt and Pd are MoO$_3$, WO$_3$, Cr$_2$O$_3$, CoO, NiO, PtO and PdO, respectively) compounded based on the total catalyst weight of the finished crystalline catalyst composition is as follows:

the Group VI metal component: from about 1 to 20% by weight, preferably from about 1 to 15% by weight, the Group VIII metal component: from about 0 to 7% by weight, that is, the iron group metal component: from 0 to 7% by weight, preferably from about 1 to 5% by weight, and the noble metal component: from 0 to 7% by weight, preferably from about 0.1 to 2% by weight.

The hydrogenation metal component is usually deposited on a support by applying a water-soluble compound, as such or in hydrolyzed or oxidized precipitate form. Thus, the hydrogenation metal component is in the form of the water-soluble compound, metal hydroxide or metal oxide when deposited on the support. However, since it is thereafter calcined, most of the hydrogenation metal component is converted into the corresponding metal oxide and, in some cases, part of the hydrogenation metal component is converted into the metal element. Further, since the hydrogenation metal component is sometimes sulfurized prior to hydroprocessing or during hydroprocessing, it may be converted, partially or entirely, into the corresponding metal sulfide.

The crystalline catalyst composition of the present invention further contains a phosphorus or boron component. Both the phosphorus and boron components may also be present. The phosphorus content of the finished crystalline catalyst composition of the present invention is such that the weight ratio of the phosphorus component (calculated as elemental phosphorus) to Group VI metal component (calculated as the corresponding oxide) is less than 0.045:1 and preferably from about 0.010:1 to 0.043:1. Also, the boron content of the finished crystalline catalyst is such that the weight ratio of the boron component (calculated as elemental boron) to Group VI metal component (calculated as the corresponding oxide) is less than 0.045:1 and preferably from about 0.010:1 to 0.043:1. In the case where phosphorus and boron are used in combination, the weight ratio of the total amount of the phosphorus and boron components (calculated as elemental phosphorus and elemental boron) to the Group VI metal component (calculated as the corresponding oxide) is from 0.01:1 to 0.08:1 and the weight ratio of each of the phosphorus component and the boron component (calculated as elemental phosphorus and elemental boron) to the Group VI metal component (calculated as the corresponding oxide) is below 0.045:1.

The phosphorus or boron component is, as described hereinafter, used as an essential component at the step of depositing the Group VI metal component on a support and thus is included into the crystalline catalyst composition of the present invention. When deposited on the support, the phosphorus and boron components are in the form of water-soluble compounds as in the case of the hydrogenation metal component. It is believed, however, that at the subsequent calcination most of the phosphorus and boron components are converted into the corresponding oxides or elements (free phosphorus or boron).

The crystalline catalyst composition of the present invention cannot be prepared merely by mixing the necessary components in the above-specified proportions. That is, the crystalline catalyst composition of the present invention is necessarily prepared under specific conditions. In depositing the Group VI metal component on a support comprising zeolite and the inorganic oxide matrix, the support is contacted with a solution containing the Group VI metal component and the phosphorus component and/or the boron component, the weight ratio of the amount of the phosphorus component and boron component (calculated as elemental phosphorus and elemental boron) to the Group VI metal component (calculated as the corresponding oxide) being from 0.01:1 to 0.08:1 and the weight ratio of each of phosphorus component and boron component (calculated as elemental phosphorus and elemental boron) to the Group VI metal component (calculated as the corresponding oxide) being less than 0.045:1 and preferably from 0.010:1 to 0.043:1, and said solution having an initial pH value (pH value in the absence of the support) of from about 3.3 to 6.0 and preferably from about 4.0 to 5.5. The phosphorus and boron components may be used singly or in combination with each other. The amounts of the phosphorus and boron components used relative to the Group VI metal component should be controlled within the above-specified ranges. Outside these ranges, the crystal structure of a crystalline aluminosilicate zeolite will be destroyed. The proportion of each of the phosphorus component, boron component and the Group VI metal component in the solution is essentially equal to that of each of the phosphorus component, boron component and Group VI metal component as deposited on the support.

If the pH value of the solution is too low, the crystal structure of the crystalline aluminosilicate zeolite is destroyed. On the other hand, if the pH value is in excess of about 6.0, the Group VI metal component precipitates and cannot be uniformly deposited on the support. The pH value of the solution varies with the type of the metal component used and the type of the phosphorus or boron component used. It can also be controlled by changing the concentrations of the components, or adding acids such as hydrochloric acid, sulfuric acid or nitric acid.

Compounds containing both the Group VI metal and phosphorus or boron, such as phosphomolybdic acid and phosphotungstic acid, act as a combination of the Group VI metal component and the phosphorus or boron component.

As the Group VI metal component, water-soluble Group VI metal compounds can be used, including ammonium paramolybdate, molybdic acid, ammonium molybdate, molybdenum trioxide, molybden blue, ammonium phosphomolybdate, phosphomolybdic acid, ammonium tungstate, tungstic acid, tungstic anhydride, phosphotungstic acid, ammonium chromate, and chromic acid.

As phosphorus and boron components, water-soluble phosphorus and boron compounds can be used. Water-soluble phosphorus compounds include phosphoric acid, phosphorous acid, hypophosphorous acid, phosphomolybdic acid, ammonium phosphomolybdate, phosphotungstic acid, and ammonium phosphotungstate. Water-soluble boron compounds include boric acid, ammonium borate, boron oxide, boron chloride, and boron fluoride.

The solution containing the Group VI metal component and phosphorus or boron component can be contacted with the support in a conventional manner such as by dipping the support in a solution thereof, kneading the support and a solution thereof, dropping the solution thereof on the support and ion exchanging by dipping the support in the solution thereof. The contacting of the support with the solution is carried out usually at room temperature and under atmospheric pressure for about 0.2 to 10 hours. The support which is to be contacted with the solution may or may not be molded.

The crystalline catalyst composition of the present invention can thus be prepared by conventional methods except that the above-described Group VI metal component and phosphorus or boron component are deposited on the support. The Group VIII metal component can also be deposited on the support by conventional methods. For example, the support can be contacted with a solution containing the Group VIII metal component. That is, the support can be dipped in a solution containing the Group VIII metal component, the support can be kneaded with such solution, such solution can be dropped on the support or the support is dipped in such solution to achieve ion exchange. The contacting of the support with the solution is carried out usually at room temperature and under atmospheric pressure for about 0.2 to 10 hours. The Group VIII metal component may be deposited along with the Group VI metal component, or the Group VIII metal component may be deposited before or after the deposition of the Group VI metal component.

When the Group VIII metal component is deposited on the support by contacting a solution containing the Group VIII metal component with the support, water-soluble Group VIII metal compounds can be used, including cobalt or nickel nitrate, sulfate, fluoride, chloride, bromide, acetate, carbonate, and phosphate, palladium chloride, and chloroplatinic acid. The Group VIII metal component is optional.

The support comprising the crystalline aluminosilicate zeolite and matrix can be prepared, for example, by mixing the zeolite and hydrogel of the matrix component, removing water from the resulting mixture, and molding it to a suitable size. The support can be kneaded with a solution containing the hydrogenation metal component, etc., for example, by mixing the zeolite and a hydrogel of the matrix component and a solution containing the hydrogenation metal component, etc., stirring the mixture, removing water from the mixture and then molding the mixture. The thus-prepared molded product is usually dried and calcined. When the hydrogenation metal component, etc., are deposited on the molded product, they are deposited on the molded product, dried and then calcined. When the hydrogenation metal component is deposited at least twice, it is usually preferred that every time the hydrogenation metal component is deposited, the molded product is dried and then calcined.

Drying is usually carried out at room temperature to about 150° C., particularly at about 100° to 120° C., for at least about 5 hours, particularly 12 to 24 hours under an atmosphere of air or nitrogen gas and under atmospheric pressure.

Calcination is usually carried out at about 350° to 600° C., particularly about 400° to 550° C., for about at least 3 hours, particularly from 12 to 24 hours under an atmosphere of air or nitrogen gas and under atmospheric pressure.

The crystal structure of the crystalline aluminosilicate zeolite in the above-prepared crystalline catalyst composition can be identified by measuring the strength of the peaks at angles of diffraction ($2\theta$) characteristic of the zeolite (6.2° and 15.7° for faujasite Y-type zeolite) by X-ray diffraction. More conveniently, the crystal structure can be identified by measuring the surface area by the nitrogen adsorption method. This is based on the fact that since zeolite has a markedly great surface area as compared with the matrix and metal component, if the zeolite crystal structure is stably held in the catalyst, the surface area of the catalyst is high, whereas if the crystal structure is destroyed, the surface area is markedly reduced. The crystalline catalyst composition according to the present invention retains at least about 70%, usually about 80 to 95% of the original strength of the peaks of the support used at angles of diffraction ($2\theta$) characteristic of a crystalline aluminosilicate zeolite by X-ray diffraction, and retains at least about 70%, usually about 80 to 95% of the original surface area of the support used.

The crystalline catalyst composition of the present invention is effective for use in the conversion of hydrocarbons, particularly in hydrocracking. That is, hydrocarbons can be efficiently converted and particularly hydrocracked by contact with the crystalline catalyst composition in the presence of hydrogen at elevated temperatures and pressures. Hydrocarbons which can be used include crude oil, residual oil, deasphalted oil resulting from deasphalting of crude oil or residual oil, distillate oil, gas oil, naphtha, and vacuum gas oil.

Preferred reaction conditions are such that the temperature is from about 350° to 450° C., the hydrogen partial pressure is from about 50 to 200 kg/cm$^2$, the liquid hourly space velocity is from about 0.1 to 5 hr$^{-1}$ and the feed ratio of hydrogen to hydrocarbon oil is from about 500 to 2,800 Nl/l. The crystalline catalyst composition of the present invention may be subjected to a preliminary sulfurization by passing hydrogen sulfide gas or a sulfur-containing oil such as kerosene through the catalyst bed prior to the conversion of hydrocarbons. The main reaction can be carried out by conventional procedures such as passing a hydrocarbon feedstock and hydrogen as a downward stream through the catalyst bed, or by passing a hydrocarbon feedstock as a downward stream and hydrogen as an upward stream through the catalyst bed.

Hydrocarbons which have been previously treated with hydrogen in the presence of hydroprocessing catalysts can be used as feedstocks and subjected to hydroprocessing by the use of the crystalline catalyst composition of the present invention. For example, crude oil, residual oil, deasphalted oil resulting from deasphalting of crude oil or residual oil, distillate oil, gas oil, vacuum gas oil or naphtha previously treated with hydrogen in the presence of a hydroprocessing catalyst can be subjected to hydroprocessing by the use of the crystalline catalyst composition of the present invention.

Catalysts which are used in such a pretreatment include hydrodenitrogenation catalysts, hydrodesulfurization catalysts, hydrodemetallization catalysts, and asphaltene-cracking catalysts. These catalysts are known in the art and usually comprise an inorganic oxide support, such as alumina and silica-alumina, and a Group VI metal component, such as molybdenum and tungsten, and a Group VIII metal component, such as nickel and cobalt, deposited on the support, wherein the Group VI metal component constitutes from about 5 to 30% by weight (calculated as the corresponding oxide) based on the total catalyst weight, the Group VIII metal component constitutes from about 2 to 7% by weight (calculated as the corresponding oxide) based on the total catalyst weight, the silica constitutes about 20% by weight or less based on the total catalyst weight, and the balance is alumina. These pretreatment catalysts usually have a surface area of from about 100 to 300 m$^2$/g, a pore volume of from about 0.4 to 0.7 ml/g, and an average pore diameter of from about 50 to 200 Å.

Usually the pretreatment catalysts cause denitrogenation, desulfurization, demetallization and asphaltene-racking simultaneously. Conditions at which the pretreatment is carried out are such that the temperature is from about 340° to 430° C., the hydrogen partial pressure is from about 50 to 150 kg/cm$^2$, the liquid hourly space velocity is from about 0.2 to 3.0 hr$^{-1}$ and the feed ratio of hydrogen to hydrocarbon oil is from about 350 to 2,800 Nl/l.

Hydrocarbons which have been pretreated under the above-described conditions are subjected to hydroprocessing by the use of the crystalline catalyst composition of the present invention. Reaction conditions as employed in this case are the same as the earlier-described reaction conditions employed in hydroprocessing hydrocarbon feedstocks which have not been subjected to the pretreatment. When the pretreated hydrocarbon feedstock is subjected to hydroprocessing with the crystalline catalyst composition of the present invention, catalytic activity, such as hydrocracking activity, is very high and the rate of deterioration of catalytic activity is low; thus the catalyst life is long as compared with the case where a hydrocarbon feedstock not subjected to the pretreatment is used.

In the crystalline catalyst composition of the present invention, any form of a crystalline aluminosilicate zeolite can be used and the crystal structure of the zeolite holds its original form with almost no break-down. Thus, the acid activity of the zeolite is sufficiently exhibited. Further, since the metal components are deposited near the acid sites of the zeolite with high diffusion hydrogenation activity is sufficiently exhibited and the crystalline catalyst composition of the present invention exhibits high activity in the conversion of hydrocarbons, particularly in hydrocracking. The crystalline catalyst composition of the present invention possesses desulfurization, denitrogenation, and demetallization activity as well as hydrocracking activity, and further has a long service life.

In view of the fact that when Group VI metal components are deposited on a crystalline aluminosilicate zeolite by conventional procedures the crystal structure of the zeolite is destroyed, and the fact that when Group VI metal components are deposited on a crystalline aluminosilicate zeolite-containing support under strongly acid conditions in the presence of a large amount of an acid of phosphorus according to the methods described in U.S. Pat. No. 3,706,693 and Canadian Pat. Nos. 972,308 and 972,340 the crystal structure of the zeolite is destroyed (although there can be obtained catalysts of higher activity than those prepared by other conventional methods), it appears that the crystal structure of the zeolite cannot be prevented from being destroyed by depositing Group VI metal components thereon.

Unexpectedly, however, according to the present invention a Group VI metal component can be deposited on the zeolite without breaking down the crystal structure of the zeolite. This could not be anticipated from conventional findings. The catalytic activity of the crystalline catalyst composition of the present invention is very high as compared with those of conventional catalysts since the crystal structure of the zeolite is not destroyed. With the crystalline catalyst composition of the present invention, it is possible to treat heavy oils which are difficult to treat with conventional catalyst, and even residual oils containing asphalt, metals, sulfur, nitrogen, etc., can be treated.

The present invention is described in greater detail with reference to the following examples. Unless otherwise indicated, all dissolution steps to prepare impregnation solutions and all contacting steps to impregnate catalyst supports with the impregnation solutions were carried out at room temperature in the following examples. Unless otherwise indicated, all drying and calcination steps were carried out under an atmosphere of air at atmospheric pressure in the following examples.

EXAMPLE 1

The following two impregnation solutions A and B were prepared.

Impregnation Solution A

Ammonium paramolybdate (264 g) was dissolved in 1,000 ml of distilled water, and 28.5 g of phosphoric acid was added thereto and uniformly dissolved by stirring. The pH of the resulting solution was 4.6 and the weight ratio of the phosphorus component (calculated as elemental phosphorus) to molybdenum component (as calculated as the corresponding oxide) (this ratio is hereinafter abbreviated to P/MoO$_3$) was 0.042:1.

Impregnation Solution B

Nickel nitrate (272 g) was dissolved in 750 ml of distilled water.

A mixture of 450 g of the hydrogen (H+) form of faujasite Y-type zeolite and 10.5 kg of an alumina hydrogel (alumina content: 1,050 g) was kneaded, freed of water, and extrusion molded into a cylindrical form of a diameter of about 1.6 mm (1/16 inch) and a length of 3 mm. This mold was dried at 120° C. for 24 hours and then calcined at 550° C. for 12 hours to prepare a zeolite/alumina-base catalyst support. The surface area of the support as determined by the nitrogen adsorption method was 340 m$^2$/g.

Impregnation solution A was gradually dropped on the support so that the support was impregnated with impregnation solution A. After all the impregnation solution A was applied, the support was allowed to stand for 1 hour, dried at 120° C. for 24 hours, and then calcined at 500° C. for 12 hours. Subsequently the support was impregnated with impregnation solution B by gradually dropping it thereon, then dried at 120° C. for 24 hours and then calcined at 450° C. for 12 hours. The thus-prepared catalyst, Catalyst F$_1$, had the following chemical composition:

|  | % by weight |
|---|---|
| MoO$_3$ | 11.9 |
| NiO | 3.9 |
| P | 0.5 |
| Zeolite | 27.1 |
| Alumina | balance |

The amount of the metal component was calculated as the corresponding oxide, the amount of the phosphorus or boron component was calculated as elemental phosphorus or boron, and the amounts of ion-exchanged metal components of the zeolites were calculated as the corresponding metal elements. Zeolite indicated the crystalline aluminosilicate zeolite component used, and the amount of the zeolite containing any ion-exchanged metal was calculated as containing the ion-exchanged metal (these apply to all the examples as described hereinafter).

For the above-prepared catalyst, the P/MoO$_3$ weight ratio was 0.042:1 and the surface area was 316 m$^2$/g The zeolite crystal structure was confirmed by X-ray diffraction.

COMPARATIVE EXAMPLE 1

Impregnation Solution C

Ammonium paramolybdate (264 g) was dissolved in 1,000 ml of distilled water. The pH of the resulting solution was 6.3, and the solution did not contain phosphorus.

A catalyst was prepared in the same manner as in Example 1 except that impregnation solution C was used in place of impregnation solution A. The chemical composition of the catalyst, Catalyst F$_2$, was as follows:

|  | % by weight |
|---|---|
| MoO$_3$ | 12.4 |
| NiO | 4.3 |
| P | — |
| Zeolite | 25.0 |
| Alumina | balance |

For this catalyst, the P/MoO$_3$ weight ratio was 0 and the surface area was 147 m$^2$/g. No peak characteristic of the crystal structure of zeolite was observed by X-ray diffraction.

COMPARATIVE EXAMPLE 2

Impregnation Solution D

Ammonium paramolybdate (264 g) was dissolved in 1,000 ml of distilled water, and 171 g of phosphoric acid was added thereto and uniformly dissolved by stirring. The pH of the resulting solution was 2.0 and the P/MoO$_3$ weight ratio was 0.25:1.

A catalyst was prepared in the same manner as in Example 1 except that impregnation solution D was used in place of impregnation solution A. The chemical composition of the catalyst, Catalyst F$_3$, was as follows:

|  | % by weight |
|---|---|
| MoO$_3$ | 11.9 |
| NiO | 3.6 |
| P | 3.0 |
| Zeolite | 24.5 |
| Alumina | balance |

For this catalyst, the P/MoO$_3$ weight ratio was 0.252:1 and the surface area was 115 m$^2$/g. No peak characteristic of the crystal structure of Zeolite was observed by X-ray diffraction.

EXAMPLE 2

Impregnation Solution E

Phosphomolybdic acid (227 g) was dissolved in 1,500 ml of distilled water. The pH of the resulting solution was 3.3 and the P/MoO$_3$ weight ratio was 0.018:1.

A catalyst was prepared in the same manner as in Example 1 except that impregnation solution E was used in place of impregnation solution A. The chemical composition of the catalyst, Catalyst F$_4$, was as follows:

|  | % by weight |
|---|---|
| MoO$_3$ | 12.5 |
| NiO | 3.7 |
| P | 0.22 |
| Zeolite | 25.1 |
| Alumina | balance |

For this catalyst, the P/MoO$_3$ weight ratio was 0.018:1 and the surface area was 304 m$^2$/g.

EXAMPLE 3

Impregnation Solution F

Ammonium paramolybdate (264 g) was dissolved in 1,000 ml of distilled water, and 45 g of boric acid was added thereto and uniformly dissolved by stirring. The pH of the resulting solution was 5.0 and the $B/MoO_3$ weight ratio was 0.043:1.

A catalyst was prepared in the same manner as in Example 1 except that impregnation solution F was used in place of impregnation solution A. The chemical composition of the catalyst, Catalyst $F_5$, was as follows:

|  | % by weight |
| --- | --- |
| $MoO_3$ | 12.3 |
| NiO | 4.0 |
| B | 0.53 |
| Zeolite | 25.0 |
| Alumina | balance |

For this catalyst, the $B/MoO_3$ weight ratio was 0.043:1 and the surface area was 284 $m^2/g$.

EXAMPLE 4

Impregnation Solution G

Phosphomolybdic acid (227 g) was dissolved in 1,200 ml of distilled water and then 45 g of boric acid was dissolved therein. The pH of the resulting solution was 3.5, the $P/MoO_3$ weight ratio was 0.018:1, and the $B/MoO_3$ weight ratio was 0.042:1.

A catalyst was prepared in the same manner as in Example 1 except that impregnation solution G was used in place of impregnation solution A. The chemical composition of the catalyst was as follows:

|  | % by weight |
| --- | --- |
| $MoO_3$ | 11.9 |
| NiO | 4.0 |
| P | 0.21 |
| B | 0.50 |
| Zeolite | 25.0 |
| Alumina | balance |

For this catalyst, the surface area was 320 $m^2/g$, the $P/MoO_3$ weight ratio was 0.018:1, and the $B/MoO_3$ weight ratio was 0.042:1.

EXAMPLE 5

The same hydrogen ($H^+$) form of faujasite Y-type zeolite as used in Example 1 was cation exchanged using an aqueous solution of lanthanum chloride to prepare La ion-exchanged faujasite Y-type zeolite. The thus-prepared zeolite was mixed with a silica-alumina sol prepared from water glass and aluminum sulfate, extrusion molded into a cylindrical form of a diameter of about 1.6 mm (1/16 inch) and a length of 3 mm in the same manner as in Example 1, and then dried and calcined in the same manner as in Example 1 to prepare an La ion-exchanged faujasite Y-type zeolite/silica-alumina-base catalyst support. The surface area of the support was 320 $m^2/g$.

Impregnation Solution H

Cobalt nitrate (272 g) was dissolved in 750 ml of distilled water.

A catalyst was prepared in the same manner as in Example 1 except that the above La ion-exchanged faujasite Y-type zeolite/silica-alumina-base support was used in place of the faujasite Y-type zeolite/alumina-base support, and impregnation solution H was used in place of impregnation solution B. The chemical composition of the catalyst, Catalyst $F_7$, was as follows:

|  | % by weight |
| --- | --- |
| $MoO_3$ | 10.6 |
| CoO | 3.5 |
| P | 0.45 |
| La | 3.0 |
| Zeolite | 27.7 |
| Silica | 43.3 |
| Alumina | 14.45 (balance) |

The amount of the zeolite was calculated as containing lanthanum.

For this catalyst, the surface area was 315 $m^2/g$ and the $P/MoO_3$ weight ratio was 0.042:1.

EXAMPLE 6

The same hydrogen ($H^+$) form of faujasite Y-type zeolite as used in Example 1 was cation exchanged using a solution of a palladium/ammonia complex $Pd(NH_3)_2Cl_2$. The palladium content of the zeolite after the cation exchange was 0.56% by weight.

A titanium sulfate solution (titanium content as $TiO_2$:525 g) was adjusted to pH 7.0 by adding aqueous ammonia in small portions, and the thus-obtained precipitate was washed with distilled water to yield a titanium hydrogel. An aluminum sulfate solution (aluminum content as $Al_2O_3$:525 g) was neutralized with aqueous ammonia in the same manner as above, and the resulting precipitate was washed with water to yield an alumina hydrogel.

These two hydrogels and the above-prepared Pd ion-exchanged faujasite Y-type zeolite in which $H^+$ was partially replaced by $Pd^{++}$ were mixed and kneaded, freed of water and extrusion molded into a cylindrical form of a diameter of about 1.6 mm (1/16 inch) and a length of 3 mm. This molding was dried at 120° C. for 24 hours and then calcined at 550° C. for 12 hours to prepare a Pd ion-exchanged faujasite Y-type zeolite/alumina titania-base catalyst support. The surface area of the support was 285 $m^2/g$.

A catalyst was prepared in the same manner as in Example 1 except that the above Pd ion-exchanged faujasite Y-type zeolite/alumina titania-base support was used in place of the faujasite Y-type zeolite/alumina-base support, and impregnation solution H as used in Example 5 was used in place of impregnation solution B. The thus-prepared catalyst, Catalyst $F_8$, had the following chemical composition:

|  | % by weight |
| --- | --- |
| $MoO_3$ | 14.7 |
| CoO | 3.8 |
| Pd | 0.14 |
| P | 0.62 |
| Zeolite | 24.34 |
| Titania | 28.5 |
| Alumina | 28.04 (balance) |

The amount of the zeolite was calculated as containing palladium.

For this catalyst, the surface area was 254 $m^2/g$ and the $P/MoO_3$ weight ratio was 0.042:1.

EXAMPLE 7

Impregnation Solution I

Ammonium paratungstate $(NH_4)_{10}W_{12}O_{41}.5H_2O$ (48.5 g) was dissolved in 1,000 ml of distilled water, and 5.7 g of phosphoric acid was dissolved therein. The pH of the resulting solution was 4.5 and the P/WO$_3$ weight ratio was 0.042:1.

A hydrogen (H$^+$) form of faujasite Y-type zeolite/alumina-based catalyst support was prepared in the same manner as in Example 1 and impregnated with impregnation solution I as prepared above. That is, impregnation solution I was dropped and deposited on the support and then dried at 120° C. for 3 hours. This impregnation and drying procedure was repeated five times. Finally the support impregnated with impregnation solution I and dried five times was then dried at 120° C. for 21 hours and calcined at 500° C. for 12 hours. Thereafter, the support was impregnated with impregnation solution B, dried and then calcined in the same manner as in Example 1 to prepare a catalyst. The chemical composition of the catalyst, Catalyst F$_9$, was as follows:

|  | % by weight |
| --- | --- |
| WO$_3$ | 11.3 |
| NiO | 4.0 |
| P | 0.48 |
| Zeolite | 25.3 |
| Alumina | balance |

For this catalyst, the surface area was 298 m$^2$/g and the P/WO$_3$ weight ratio was 0.042:1.

EXAMPLE 8

Impregnation Solution J

Phosphotungstic acid P$_2$O$_5$.24WO$_3$.nH$_2$O (111 g) was dissolved in 1,500 ml of distilled water, and 45 g of boric acid was then dissolved therein. The pH of the resulting solution was 3.3, the P/WO$_3$ weight ratio was 0.012:1, and the B/WO$_3$ weight ratio was 0.043:1.

A catalyst was prepared in the same manner as in Example 1 except that impregnation solution J was used in place of impregnation solution A. The chemical composition of the catalyst, Catalyst F$_{10}$, was as follows:

|  | % by weight |
| --- | --- |
| WO$_3$ | 11.5 |
| NiO | 3.8 |
| P | 0.14 |
| B | 0.49 |
| Zeolite | 25.2 |
| Alumina | balance |

For this catalyst, the surface area was 312 m$^2$/g, the P/WO$_3$ weight ratio was 0.012:1, and the B/WO$_3$ weight ratio was 0.043:1.

EXAMPLE 9

Impregnation Solution K

Ammonium paramolybdate (52.8 g) was dissolved in 200 ml of distilled water, and 5.7 g of phosphoric acid was then dissolved therein. The pH of the resulting solution was 3.4 and the P/MoO$_3$ weight ratio was 0.039:1.

Impregnation Solution L

Nickel nitrate (54 g) was dissolved in 150 ml of distilled water.

Aluminum sulfate (aluminum content as alumina: 210 g) (1,370 g) was dissolved in 5,000 ml of distilled water and then adjusted to pH 7.0 by gradually adding aqueous ammonia while vigorously stirring. With further vigorous stirring, 90 g of a hydrogen (H$^+$) form of faujasite Y-type zeolite was added thereto. The resulting mixture was mixed, and then impregnation solution K was added. The mixture was further kneaded, dried at 120° C. for 24 hours to remove water, and extrusion molded into a cylindrical form of a diameter of about 1.6 mm (1/16 inch) and a length of 3 mm. This molding was dried at 120° C. for 24 hours and then calcined at 550° C. for 12 hours to prepare a catalyst support.

The support was impregnated with impregnation solution L by gradually dropping it thereon. After impregnation solution L was all dropped, the impregnated support was allowed to stand for 1 hour, dried at 120° C. for 24 hours, and then calcined at 450° C. for 12 hours to prepare a catalyst. The chemical composition of the catalyst, Catalyst F$_{11}$, was as follows:

|  | % by weight |
| --- | --- |
| MoO$_3$ | 10.3 |
| NiO | 4.2 |
| P | 0.4 |
| Zeolite | 25.5 |
| Alumina | balance |

For this catalyst, the surface area was 282 m$^2$/g and the P/MoO$_3$ weight ratio was 0.039:1. (The support consisting of alumina and a hydrogen form of faujasite Y-type zeolite was prepared in the same manner as above except that impregnation solutions K and L were not used. The surface area of the thus-prepared support was 330 m$^2$/g.)

EXAMPLE 10

A mixture of 450 g of a hydrogen (H$^+$) form of mordenite-type zeolite and 10.5 kg of an alumina hydrogel (alumina content: 1,050 g) was kneaded, freed of water, and then extrusion molded in a cylindrical form of a diameter of about 1.6 mm (1/16 inch) and a length of 3 mm. This molding was dried at 120° C. for 24 hours and then calcined at 550° C. for 12 hours to prepare a zeolite/alumina-base catalyst support. The surface area of the support was 242 m$^2$/g.

A catalyst was prepared in the same manner as in Example 1 except that the catalyst support was replaced by the above-prepared support. The chemical composition of the catalyst, Catalyst F$_{12}$, was as follows:

|  | % by weight |
| --- | --- |
| MoO$_3$ | 11.5 |
| NiO | 3.8 |
| P | 0.5 |
| Zeolite | 25.3 |
| Alumina | balance |

For this catalyst, the surface area was 225 m$^2$/g and the P/MoO$_3$ weight ratio was 0.043:1.

EXAMPLE 11

A hydro-pretreated atmospheric residue was hydrocracked using the catalysts prepared in Examples 1 to 10 and Comparative Examples 1 and 2. Characteristics of the feedstock were as follows:

Specific gravity (15/4° C.): 0.9136
Pour point, °C.: 30.0
Viscosity, cST (50° C.): 106.8

Carbon residue, wt %: 4.30
Sulfur, wt %: 0.27
Nitrogen, wt %: 0.12
Asphaltene, wt %: 1.4
Ni content, wt ppm: 7
V content, wt ppm: 15
Distillation characteristics (calculated at ordinary pressure), °C.:
  IBP: 295
  50 vol %: 473

The conversion was performed in a continuous flow-type reactor with fixed catalyst bed under the following conditions:
  Amount of catalyst: 15 ml
  Liquid hourly space velocity of feed oil: 0.3 hr$^{-1}$
  Reaction pressure (hydrogen pressure): 151 kg/cm$^2$
  Reaction temperature: 390° C.
  Hydrogen/oil ratio: 2,670 Nl/l The degree of cracking (i.e., the degree of conversion of a fraction having a boiling point of more than 343° C. (650° F.) into a fraction having a boiling point of less than 343° C. (650° F.)) at the fifteenth day from the start of the reaction was as follows:

| Catalyst | Degree of Cracking (%) | Degree of Desulfurization (%) | Degree of Denitrogenation (%) |
|---|---|---|---|
| $F_1$ | 16.0 | 75.0 | 30.0 |
| $F_2$ | 5.0 | 63.3 | 21.5 |
| $F_3$ | 3.5 | 60.5 | 25.4 |
| $F_4$ | 18.3 | 73.8 | 29.8 |
| $F_5$ | 21.5 | 79.1 | 32.1 |
| $F_6$ | 22.9 | 81.4 | 35.2 |
| $F_7$ | 16.5 | 70.0 | 30.4 |
| $F_8$ | 28.7 | 69.3 | 28.3 |
| $F_9$ | 24.5 | 72.1 | 30.4 |
| $F_{10}$ | 24.4 | 71.1 | 35.8 |
| $F_{11}$ | 19.8 | 72.2 | 36.1 |
| $F_{12}$ | 10.5 | 63.7 | 25.8 |

EXAMPLE 12

An atmospheric residue was hydrocracked with the catalysts prepared in Examples 1 to 10 and Comparative Examples 1 and 2. Characteristics of the feedstock were as follows:
  Specific gravity (15/4° C.): 0.9492
  Pour point, °C.: 10.0
  Viscosity, cST (50° C.): 138.6
  Carbon residue, wt %: 7.88
  Sulfur, wt %: 2.97
  Nitrogen, wt %: 0.12
  Asphaltene, wt %: 1.89
  Ni content, wt ppm: 7
  V content, wt ppm: 27
  Distillation characteristics (calculated at ordinary pressure), °C.:
    IBP: 182
    50vol % 470

The conversion was carried out in the same continuous flow-type reactor as used in Example 11 under the following conditions:
  Amount of catalyst: 15 ml
  Liquid hourly space velocity of feed oil: 0.3 hr$^{-1}$
  Reaction pressure (hydrogen pressure): 106 kg/cm$^2$
  Reaction temperature: 390° C.
  Hydrogen/oil ratio: 2,670 Nl/l The degree of cracking at the fifteenth day from the start of the reaction was as follows:

| Catalyst | Degree of Cracking (%) | Degree of Desulfurization (%) | Degree of Denitrogenation (%) |
|---|---|---|---|
| $F_1$ | 26.5 | 86.7 | 55.3 |
| $F_2$ | 8.0 | 74.1 | 32.1 |
| $F_3$ | 6.3 | 70.7 | 38.1 |
| $F_4$ | 27.4 | 85.3 | 28.7 |
| $F_5$ | 28.3 | 88.2 | 60.0 |
| $F_6$ | 29.8 | 89.4 | 52.4 |
| $F_7$ | 24.1 | 73.2 | 50.4 |
| $F_8$ | 34.2 | 72.4 | 48.3 |
| $F_9$ | 32.2 | 86.1 | 50.5 |
| $F_{10}$ | 33.4 | 82.6 | 48.1 |
| $F_{11}$ | 26.4 | 83.3 | 52.9 |
| $F_{12}$ | 15.3 | 70.5 | 43.2 |

EXAMPLE 13

A vacuum gas oil was hydrocracked with Catalyst $F_1$ prepared in Example 1. Characteristics of the vacuum gas oil were as follows:
  Specific gravity (15/4° C.): 0.9223
  Pour point, °C.: +35.0
  Viscosity, cST (50° C.): 36.53
  Sulfur, wt %: 2.45
  Nitrogen, wt %: 0.84
  Asphaltene, wt %: 0.04
  Carbon residue, wt %: 0.41
  Distillation characteristics (calculated at ordinary pressure), °C.:
    IBP: 351
    50 vol %: 452

The reaction was carried out in a continuous flow-type reactor under the following conditions:
  Amount of catalyst: 15 ml
  Liquid hourly space velocity of feed oil: 2.0 hr$^{-1}$
  Reaction pressure (hydrogen pressure): 105 kg/cm$^2$
  Reaction temperature: 400° C.
  Hydrogen/oil ratio: 2,670 Nl/l The degree of cracking, degree of desulfurization, and degree of denitrogenation at the fifteenth day and thirtieth day from the start of the reaction were as follows:

|  | Fifteenth Day | Thirtieth Day |
|---|---|---|
| Degree of Cracking (%) | 15.0 | 10.0 |
| Degree of Desulfurization (%) | 90.0 | 87.0 |
| Degree of Denitrogenation (%) | 45 | 40 |

EXAMPLE 14

In this example, Catalyst $F_1$ in Example 1 was used in combination with a pretreatment catalyst. The same vacuum gas oil as used in Example 13 was hydrocracked by sequentially passing the oil through a reaction system consisting of a reaction tube charged with the pretreatment catalyst and a reaction tube charged with Catalyst $F_1$ which were connected in series. Characteristics of the pretreatment catalyst were as follows:
  Chemical Composition
  NiO: 5.0 wt %
  NoO$_3$: 20.5 wt %
  Al$_2$O$_3$: balance
  Physical Properties
  Surface area: 155 m$^2$/g
  Pore volume: 0.46 ml/g The pretreatment was performed under the following conditions:
  Amount of catalyst: 7.5 ml
  Liquid hourly space velocity of feed oil: 1.0 hr$^{-1}$
  Reaction pressure (hydrogen pressure): 105 kg/cm$^2$
  Reaction temperature: 390° C.
  Hydrogen/oil ratio: 2,670 Nl/l The hydrocracking using Catalyst $F_1$ of the second step was performed under the following conditions:
  Amount of catalyst: 7.5 ml
  Liquid hourly space velocity of feed oil: 1.0 hr$^{-1}$
  Reaction pressure (hydrogen pressure): 105 kg/cm$^2$
  Reaction temperature: 400° C.
  Hydrogen/oil ratio: 2,670 Nl/l The overall degree of cracking, overall degree of desulfurization, and overall degree of denitrogenation at the fifteenth day and thirtieth day from the start of the reaction were as follows:

|  | Fifteenth Day | Thirtieth Day |
|---|---|---|
| Degree of Cracking (%) | 25.0 | 24.8 |
| Degree of Desulfurization (%) | 99 | 99 |
| Degree of Denitrogenation (%) | 75 | 74 |

The degree of cracking, degree of desulfurization, and degree of denitrogenation at the pretreatment step, which were determined by measuring the characteristics of the oil leaving the pretreatment step, were as follows:

|  | Fifteenth Day | Thirtieth Day |
|---|---|---|
| Degree of Cracking (%) | 5.0 | 5.0 |
| Degree of Desulfurization (%) | 80 | 80 |
| Degree of Denitrogenation (%) | 60 | 58 |

For comparison, Catalyst $F_3$ prepared in Comparative Example 2 was used in combination with the same pretreatment catalyst as used above. The same vacuum gas oil as used in Example 13 was hydrocracked by passing through a reaction system consisting of a reaction tube charged with the pretreatment catalyst and a reaction tube charged with Catalyst $F_3$ which were connected in series. The reaction was performed under the same conditions as above (the amount of catalyst was 7.5 ml for both the pretreatment catalyst and Catalyst $F_3$). The overall degree of cracking, overall degree of hydrosulfurization, and overall degree of denitrogenation at the fifteenth day and thirtieth day from the start of the reaction were as follows:

|  | Fifteenth Day | Thirtieth Day |
|---|---|---|
| Degree of Cracking (%) | 12.0 | 12.0 |
| Degree of Desulfurization (%) | 95 | 95 |
| Degree of Denitrogenation (%) | 73 | 70 |

EXAMPLE 15

In this example, Catalyst $F_1$ prepared in Example 1 was used in combination with a pretreatment catalyst. The same atmospheric residue as used in Example 12 was hydrocracked by passing the same through a reaction system consisting of a reaction tube charged with the pretreatment catalyst and a reaction tube charged with Catalyst $F_1$ which were connected in series. The characteristics of the pretreatment catalyst as used herein were as follows:
  Chemical Composition
    NiO: 5.0 wt %
    $MoO_3$: 15.0 wt %
    $Al_2O_3$: balance
  Physical Properties
    Surface area: 130 m$^2$/g
    Pore volume: 0.65 ml/g The pretreatment was carried out under the following conditions:
  Amount of catalyst: 15 ml pl Liquid hourly space velocity of feed oil: 0.3 hr$^{-1}$
  Reaction pressure (hydrogen pressure): 105 kg/cm$^2$
  Reaction temperature: 390° C.
  Hydrogen/oil ratio: 2,670 Nl/l The hydrocracking using Catalyst $F_1$ of the second step was performed under the following conditions:
  Amount of catalyst 5 ml
  Liquid hourly space velocity of feed oil: 0.3 hr$^{-1}$
  Reaction pressure (hydrogen pressure): 105 kg/cm$^2$
  Reaction temperature: 390° C.
  Hydrogen/oil ratio: 2,670 Nl/l The overall degree of cracking, overall degree of desulfurization, and overall degree of denitrogenation at the fifteenth day and thirtieth day from the start of the reaction were as follows:

|  | Fifteenth Day | Thirtieth Day |
|---|---|---|
| Degree of Cracking (%) | 20.0 | 20.0 |
| Degree of Desulfurization (%) | 95 | 94.5 |
| Degree of Denitrogenation (%) | 70 | 68 |

The degree of cracking, degree of desulfurization, and degree of denitrogenation at the pretreatment step, which were determined by measuring the characteristics of the oil leaving the pretreatment step, were as follows:

|  | Fifteenth Day | Thirtieth Day |
|---|---|---|
| Degree of Cracking (%) | 12 | 12 |
| Degree of Desulfurization (%) | 90 | 89.5 |
| Degree of Denitrogenation (%) | 60 | 59 |

EXAMPLE 16

A mixture of 450 g of an ammonium ($NH_4^+$) form of faujasite Y-type zeolite and 10.5 kg of an alumina hydrogel (alumina content: 1,050 g) was kneaded, freed of water, and extrusion molded into a cylindrical form of a diameter of about 1.6 mm (1/16 inch) and a length of 3 mm. This molding was dried at 120° C. for 24 hours and then calcined at 550° C. for 12 hours to prepare a zeolite/alumina-base catalyst support. The surface area of the support as determined by the nitrogen adsorption method was 340 m$^2$/g.

The support was impregnated with impregnation solution A by gradually dropping it on the support. After all impregnation solution A was dropped, the impregnated support was allowed to stand for 1 hour, dried at 120° C. for 24 hours, and then calcined at 500° C. for 12 hours. The chemical composition of the thus-prepared catalyst, Catalyst F13, was as follows:

| | % by weight |
|---|---|
| MoO$_3$ | 12.40 |
| P | 0.52 |
| Zeolite | 28.20 |
| Alumina | balance |

For this catalyst, the surface area was 320 m$^2$/g and the P/MoO$_3$ weight ratio was 0.042:1.

EXAMPLE 17

The same hydrogen (H$^+$) form of faujasite Y-type zeolite as was used in Example 1 was cation-exchanged using a solution of a palladium ammonia complex Pd(NH$_3$)$_2$Cl$_2$. The thus-prepared Pd ion-exchanged faujasite Y-type zeolite (450 g) was mixed with 10.5 kg of an alumina hydrogel (alumina content: 1,050 g), and the resulting mixture was kneaded, freed of water, and then extrusion molded into a cylindrical form of a diameter of about 1.6 mm (1/16 inch) and a length of 3 mm. This molding was dried at 120° C. for 24 hours and then calcined at 550° C. for 12 hours to prepare a zeolite/alumina-base catalyst support. The surface area of the support as determined by the nitrogen adsorption method was 310 m$^2$/g.

The support was impregnated with impregnation solution A as used in Example 1 by gradually dropping it thereon. After all impregnation solution A was dropped, the impregnated support was allowed to stand for 1 hour, dried at 120° C. for 24 hours, and then calcined at 500° C. for 12 hours. The chemical composition of the thus-prepared catalyst, Catalyst F$_{14}$, was as follows:

| | % by weight |
|---|---|
| MoO$_3$ | 12.40 |
| P | 0.52 |
| Pd | 0.14 |
| Zeolite | 28.34 |
| Alumina | 58.74 (balance) |

For this catalyst, the surface area was 284 m$^2$/g and the P/MoO$_3$ weight ratio was 0.042:1. The amount of the zeolite was calculated as containing palladium.

EXAMPLE 18

The same atmospheric residue as used in Example 12 was hydrocracked with Catalyst F$_{13}$ prepared in Example 16 or Catalyst F$_{14}$ prepared in Example 17. The reaction was performed in the same continuous flow-type reactor and under the same conditions as in Example 12.

The degree of cracking, degree of desulfurization, and degree of denitrogenation at the fifteenth day from the start of the reaction were as follows:

| Catalyst | Degree of Cracking (%) | Degree of Desulfurization (%) | Degree of Denitrogenation (%) |
|---|---|---|---|
| F$_{13}$ | 21.5 | 80.5 | 54.5 |
| F$_{14}$ | 23.5 | 81.0 | 55.0 |

It can be seen from the above-described Examples and Comparative Examples that in the catalysts prepared by depositing the Group VI metal component on the support by the conventional method (Comparative Examples 1 and 2), the crystal structure of the zeolite was destroyed and the surface area was markedly reduced, whereas in the catalysts prepared by the process of the present invention (Examples 1 to 10, 16 and 17), the crystal structure of the zeolite was maintained in its original state and the surface area was high. This stability in the crystal structure of the zeolite greatly contributes to catalytic activity as can be seen from the catalytic activity evaluation results shown in Examples 11 to 15 and 18. That is, the catalysts of the present invention (Examples 1 to 10, 16 and 17) exhibit very high catalytic activity as compared to the catalysts prepared by the conventional method (Comparative Examples 1 and 2).

While the invention has been described in detail and with reference to specific embodiments thereof, it will be apparent to one skilled in the art that various changes and modifications can be made therein without departing from the spirit and scope thereof.

What is claimed is:

1. A crystalline catalyst composition for the conversion of hydrocarbons which comprises:

5 to 90% by weight, based on the total catalyst weight, of a crystalline aluminosilicate zeolite;

5 to 90% by weight, based on the total catalyst weight, of a porous inorganic oxide;

1 to 20% by weight, based on the total catalyst weight, of a Group VI metal component (calculated as the corresponding oxide) of a Group VI metal of the Periodic Table;

0 to 7% by weight, based on the total catalyst weight, of a Group VIII metal component (calculated as the corresponding oxide) of a Group VIII metal of the Periodic Table; and a third component selected from a phosphorus component and a boron component, and which is prepared by mixing the crystalline aluminosilicate zeolite and a hydrogel or sol of the inorganic oxide to obtain a support comprising the crystalline aluminosilicate zeolite and the inorganic oxide, and contacting the support with a solution containing a Group VI metal component and the third component selected from a phosphorus component and a boron component, the weight ratio of the total amount of the phosphorus and boron components (calculated as elemental phosphorus and elemental boron) to the Group VI metal component (calculated as the corresponding oxide) being from 0.01:1 to 0.08:1 and the weight ratio of each of the phosphorus component and the boron component (calculated as elemental phosphorus and elemental boron) to the Group VI metal component (calculated as the corresponding oxide) being below 0.045:1, and said solution having a pH value of from 3.3 to 6.0, thereby depositing the Group VI metal component and the third component selected from the phosphorus component and boron component.

2. The crystalline catalyst composition as claimed in claim 1, containing the phosphorus and boron components as the third component in such a proportion that the weight ratio of the total amount of the phosphorus and boron component (calculated as elemental phosphorus and elemental boron) to the Group VI metal component (calculated as the corresponding oxide) is from 0.01:1 to 0.08:1 and the weight ratio of each of the phosphorus component and the boron component (calculated as elemental phosphorus and elemental boron)

to the Group VI metal component (calculated as the corresponding oxide) is below 0.045:1.

3. The crystalline catalyst composition as claimed in claim 1, containing the phosphorus component alone as the third component in such a proportion that the weight ratio of the amount of the phosphorus component (calculated as elemental phosphorus) to the Group VI metal component (calculated as the corresponding oxide) is from 0.01:1 to 0.045:1.

4. The crystalline catalyst composition as claimed in claim 3, containing the phosphorus component in such a proportion that the weight ratio of the amount of the phosphorus component (calculated as elemental phosphorus) to the Group VI metal component (calculated as the corresponding oxide) is from 0.010:1 to 0.043:1.

5. The crystalline catalyst composition as claimed in claim 1, containing the boron component alone as the third component in such a proportion that the weight ratio of the amount of the boron component (calculated as elemental boron) to the Group VI metal component (calculated as the corresponding oxide) is from 0.01:1 to 0.045:1.

6. The crystalline catalyst composition as claimed in claim 5, containing the boron component in such a proportion that the weight ratio of the amount of the boron component (calculated as elemental boron) to the Group VI metal component (calculated as the corresponding oxide) is from 0.010:1 to 0.043:1.

7. The crystalline catalyst composition as claimed in claim 1, wherein the pH of the solution containing the component selected from the phosphorus and boron components is from 4.0 to 5.5.

8. The crystalline catalyst composition as claimed in claim 1, wherein the phosphorus component is phosphoric acid, phosphorous acid, hypophosphorous acid, phosphomolybdic acid, ammonium phosphomolybdate, phosphotungstic acid or ammonium phosphotungstate.

9. The crystalline catalyst composition as claimed in claim 1, wherein the boron component is boric acid, ammonium borate, boron oxide, boron chloride or boron fluoride.

10. The crystalline catalyst composition as claimed in claim 1, wherein the crystalline alumino-silicate zeolite is faujasite X-type zeolite, faujasite Y-type zeolite, chabazite zeolite, mordenite zeolite or ZSM-base zeolite.

11. The crystalline catalyst composition as claimed in claim 1, wherein the inorganic oxide is alumina, silica-alumina, titania-alumina, zirconia-alumina or silica-titania-alumina.

12. The crystalline catalyst composition as claimed in claim 1, wherein the Group VI metal is molybdenum, tungsten or chromium.

13. The crystalline catalyst composition as claimed in claim 1, wherein the Group VIII metal is cobalt, nickel, platinum or palladium.

14. The crystalline catalyst composition as claimed in claim 1, which is free of the Group VIII metal component.

15. A process for preparing a crystalline catalyst composition for the conversion of hydrocarbons, said composition comprising:

5 to 90% by weight, based on the total catalyst weight, of a crystalline aluminosilicate zeolite;

5 to 90% by weight, based on the total catalyst weight, of a porous inorganic oxide;

1 to 20% by weight, based on the total catalyst weight, of a Group VI metal component (calculated as the corresponding oxide) of a Group VI metal of the Periodic Table;

0 to 7% by weight, based on the total catalyst weight, of a Group VIII metal component (calculated as the corresponding oxide) of a Group VIII metal of the Periodic Table; and a third component selected from a phosphorus component and a boron component, which process comprises mixing the crystalline aluminosilicate zeolite and a hydrogel or sol of the inorganic oxide to obtain a support comprising:

said crystalline aluminosilicate zeolite; and said inorganic oxide, and contacting the support with a solution containing:

a Grup VI metal component; and a component selected from a phosphorus component and a boron component, the weight ratio of the total amount of the phosphorus and boron components (calculated as elemental phosphorus and elemental boron) to the Group VI metal component (calculated as the corresponding oxide) being from 0.01:1 to 0.08:1, and the weight ratio of each of the phosphorus component and the boron component (calculated as elemental phosphorus and elemental boron) to the Group VI metal component (calculated as the corresponding oxide) being below 0.045:1, and said solution having a pH value of from 3.3 to 6.0, whereupon the Group VI metal component and the component selected from the phosphorus component and boron component are deposited on the support.

16. The process as claimed in claim 15, wherein the crystalline catalyst composition contains the phosphorus and boron components as the third component in such a proportion that the weight ratio of the total amount of the phosphorus and boron components (calculated as elemental phosphorus and elemental boron) to the Group VI metal component (calculated as the corresponding oxide) is from 0.01:1 to 0.08:1 and the weight ratio of each of the phosphorus component and the boron component (calculated as elemental phosphorus and elemental boron) to the Group VI metal component (calculated as the corresponding oxide) is below 0.045:1.

17. The process as claimed in claim 15, wherein the crystalline catalyst composition contains the phosphorus component alone as the third component in such a proportion that the weight ratio of the amount of the phosphorus component (calculated as elemental phosphorus) to the Group VI metal component (calculated as the corresponding oxide) is from 0.01:1 to 0.045:1.

18. The process as claimed in claim 17, wherein the crystalline catalyst composition contains the phosphorus component alone as the third component in such a proportion that the weight ratio of the amount of the phosphorus component (calculated as elemental phosphorus) to the Group VI metal component (calculated as the corresponding oxide) is from 0.010:1 to 0.043:1.

19. The process as claimed in claim 15, wherein the crystalline catalyst composition contains the boron component alone as the third component in such a proportion that the weight ratio of the amount of the boron component (calculated as elemental boron) to the Group VI metal component (calculated as the corresponding oxide) is from 0.01:1 to 0.045:1.

20. The process as claimed in claim 19, wherein the crystalline catalyst composition contains the boron component alone as the third component in such a proportion that the weight ratio of the amount of the boron component (calculated as elemental boron) to the Group VI metal component (calculated as the corresponding oxide) is from 0.010:1 to 0.043:1.

21. The process as claimed in claim 15, wherein the pH of the solution containing the component selected from the phosphorus and boron components is from 4.0 to 5.5.

22. The process as claimed in claim 15, wherein the phosphorus component is phosphoric acid, phosphorous acid, hypophosphorous acid, phosphomolybdic acid, ammonium phosphomolybdate, phosphotungstic acid or ammonium phosphotungstate.

23. The process as claimed in claim 15, wherein the boron component is boric acid, ammonium borate, boron oxide, boron chloride or boron fluoride.

* * * * *